US010652413B1

(12) United States Patent
Cheng et al.

(10) Patent No.: US 10,652,413 B1
(45) Date of Patent: May 12, 2020

(54) SYSTEM AND METHOD FOR PAGE SET SEPARATION BASED ON IDENTIFIER ON SCANNED PAGE

(71) Applicant: EXELA TECHNOLOGIES INC., Irving, TX (US)

(72) Inventors: Xin Cheng, Santa Monica, CA (US); Par Chadha, Santa Monica, CA (US); Vadim Aristov, Troy, MI (US); Christoph Steinl, Augsburg (DE); John Fiala, Hickory Creek, TX (US)

( * ) Notice: Subject to any disclaimer, the term of this patent is extended or adjusted under 35 U.S.C. 154(b) by 0 days.

(21) Appl. No.: 16/401,939

(22) Filed: May 2, 2019

(51) Int. Cl.
| | |
|---|---|
| H04N 1/00 | (2006.01) |
| H04N 1/32 | (2006.01) |
| G06K 15/00 | (2006.01) |
| G03G 15/00 | (2006.01) |

(52) U.S. Cl.
CPC ....... *H04N 1/00628* (2013.01); *G06K 15/403* (2013.01); *H04N 1/00328* (2013.01); *H04N 1/32309* (2013.01); *G03G 15/655* (2013.01)

(58) Field of Classification Search
None
See application file for complete search history.

(56) References Cited

U.S. PATENT DOCUMENTS

| | | | | | |
|---|---|---|---|---|---|
| 5,918,879 | A | * | 7/1999 | Steinhilber | B65H 29/60 270/52.02 |
| 6,353,726 | B1 | * | 3/2002 | Murata | B65H 7/00 399/18 |
| 6,729,376 | B1 | * | 5/2004 | Kakinuma | B65H 33/04 156/256 |
| 7,113,846 | B2 | * | 9/2006 | Moriyama | G03G 15/655 270/58.14 |
| 8,854,675 | B1 | * | 10/2014 | St. Jacques, Jr. | H04N 1/00331 271/213 |
| 9,626,138 | B2 | * | 4/2017 | Bandyopadhyay | G06F 3/1252 |
| 2006/0228137 | A1 | * | 10/2006 | Steele | G03G 15/655 399/382 |
| 2006/0262648 | A1 | * | 11/2006 | Jan | A01M 29/18 367/139 |

\* cited by examiner

*Primary Examiner* — Scott A Rogers
(74) *Attorney, Agent, or Firm* — Puya Partow-Navid; Seyfarth Shaw LLP (57) ABSTRACT

A method for distinguishing a page set is presented. The method includes receiving multiple page sets. A first page or a last page of each page set marked with an identifier. The method also includes scanning a page of the multiple page sets. The method further includes determining whether the scanned page comprises the identifier and one or more of a false positive identifier or a color changed identifier. The method still further includes distinguishing the page set, corresponding to the scanned page, from other page sets of the multiple of page sets when the scanned page includes the identifier.

25 Claims, 7 Drawing Sheets

SYSTEM AND METHOD FOR PAGE SET SEPARATION BASED ON IDENTIFIER ON SCANNED PAGE

BACKGROUND

Field

Certain aspects of the present disclosure generally relate to separating documents and, more particularly, to a system and method for separating documents based on a detected mark.

Background

Document processing devices, such as scanners, are used to process pages from a batch of documents. In most cases, multiple sets of pages may be included in the batch. In conventional systems, a physical separator page is placed between the sets of pages to separate each set.

In the conventional systems, the document processing device detects a mark on the physical separator page. For example, the mark may be a barcode or machine-readable text. The physical insertion of a separator page increases processing times. As such, it is desirable to improve a system for separating sets of pages processed by a document processing device.

SUMMARY

In one aspect of the present disclosure, a method for distinguishing a page set is disclosed. The method includes receiving multiple page sets. A first page or a last page of each page set marked with an identifier. The method also includes scanning a page of the multiple page sets. The method further includes determining whether the scanned page includes the identifier and one or more of a false positive identifier or a color changed identifier. The method still further includes distinguishing the page set, corresponding to the scanned page, from other page sets of the multiple page sets when the scanned page includes the identifier.

In another aspect of the present disclosure, a non-transitory computer-readable medium with non-transitory program code recorded thereon is disclosed. The program code is for distinguishing a page set. The program code is executed by a processor and includes program code to receive multiple page sets. A first page or a last page of each page set marked with an identifier. The program code also includes program code to scan a page of the multiple page sets. The program code further includes program code to determine whether the scanned page includes the identifier and one or more of a false positive identifier or a color changed identifier. The program code still further includes program code to distinguish the page set, corresponding to the scanned page, from other page sets of the multiple page sets when the scanned page includes the identifier.

Another aspect of the present disclosure is directed to an apparatus for distinguishing a page set. The apparatus having a memory and one or more processors coupled to the memory. The apparatus also having a page receiver for receiving multiple page sets, a first page or a last page of each page set marked with an identifier. The apparatus further having a scanner for scanning a page of the multiple page sets. The processor(s) is configured to determine whether the scanned page includes the identifier and one or more of a false positive identifier or a color changed identifier. The processor(s) is also configured to distinguish the page set, corresponding to the scanned page, from other page sets of the plurality of page sets when the scanned page includes the identifier.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

As previously discussed, document processing devices may be used to capture an image of each page from a batch of documents. The batch of documents may include multiple sets of pages. When scanning the batch of documents, it is desirable to separate each set of pages. In conventional systems, a physical separator page is placed between adjacent sets of pages to separate the sets.

In the present disclosure, a document refers to a set of pages (e.g., page set), where each document includes one or more pages. A set of documents may be referred to as a batch of documents. The batch of documents may also be referred to as multiple page sets (e.g., a plurality of page sets). For clarity, the batch of documents may be referred to as a batch. Additionally, in the present disclosure the document processing device may be referred to as a document image processing device or an image processing device.

For example, a human operator may place a physical separator page between adjacent documents. The physical separator page may include a mark, such as a barcode or machine-readable text, to distinguish the physical separator page from other pages. The document processing device identifies the end of one document and the beginning of another document by identifying the mark on the physical separator page. The mark may be referred to as an identifier or an identifier mark.

Medical related documents are an example of documents that may be processed by a document processing device. Medical documents include medical history, insurance information, insurance claims, medical payments, insurance payments, and/or other related medical documents. These documents may be received at a processing center for scanning and digital storage.

The processing center may receive multiple medical documents. Each medical document (e.g., each set of medical pages) may be provided in a separate storage unit, such as an envelope or box. Although each document is received in a separate storage unit, to improve processing times, the documents may be processed at once in a batch. In this example, to distinguish each document in the batch, when the medical documents are received, a human operator places a physical separator page on top of each document removed from the storage unit.

Physically placing a separator page increases processing time. For example, the processing time is increased because the human operator is specified to place the physical separator page between adjacent documents. The number of human work hours increases as the number of groups increase. Additionally, because a human is involved, the task is prone to error.

Moreover, the addition of each physical separator page increases a number of pages that are processed. Thereby increasing processing time and also increasing wear and tear on a document processing device. As such, it is desirable to improve a system for separating documents. The absence of the physical separator page reduces the number of pages that are processed.

Some conventional systems mark a first page or last page of each document instead of using a separator page. These conventional systems use a calibration page to provide the selected mark to the document processing device. Specifically, in these conventional systems (e.g., calibration page systems), a human operator selects a mark and marks the first or last document in each group with the mark. The human operator provides the selected mark to the document processing device prior to processing the batch of documents.

For example, the selected mark may be provided on the calibration page that is fed to the document processing device. The document processing device identifies the selected mark via the calibration page and then processes the batch of documents. A document is identified based on an identified mark on a first or last page of a document.

The use of a calibration page in the calibration page system mitigates the use of a physical separator page. Nonetheless, the calibration page system still uses a human operator for selecting a mark, marking pages, and feeding the calibration page to the document processing device. As such, the calibration page system increases document processing time and increases the possibility of human error.

Aspects of the present disclosure are directed to reducing document processing time while also reducing the number of processed pages. In one configuration, a marking device is used to mark a first or last page of the document. The mark may also be referred to as an identifier. The first and last page of a document may also be marked. Each document is identified based on the mark. The identified document may be separated from an adjacent document. The documents may be separated by inserting a virtual separator sheet between documents, a flagging each document, or other separation techniques.

In one configuration, a human operator retrieves a document and marks the first or last page via the marking device. The document may be retrieved from a storage unit, such as an envelope. The marked page is then placed back into the document. The human operator may continue to mark a specific page of each document and stack the mark documents to generate a batch. The batch is then input to the document processing device.

Figure 1:
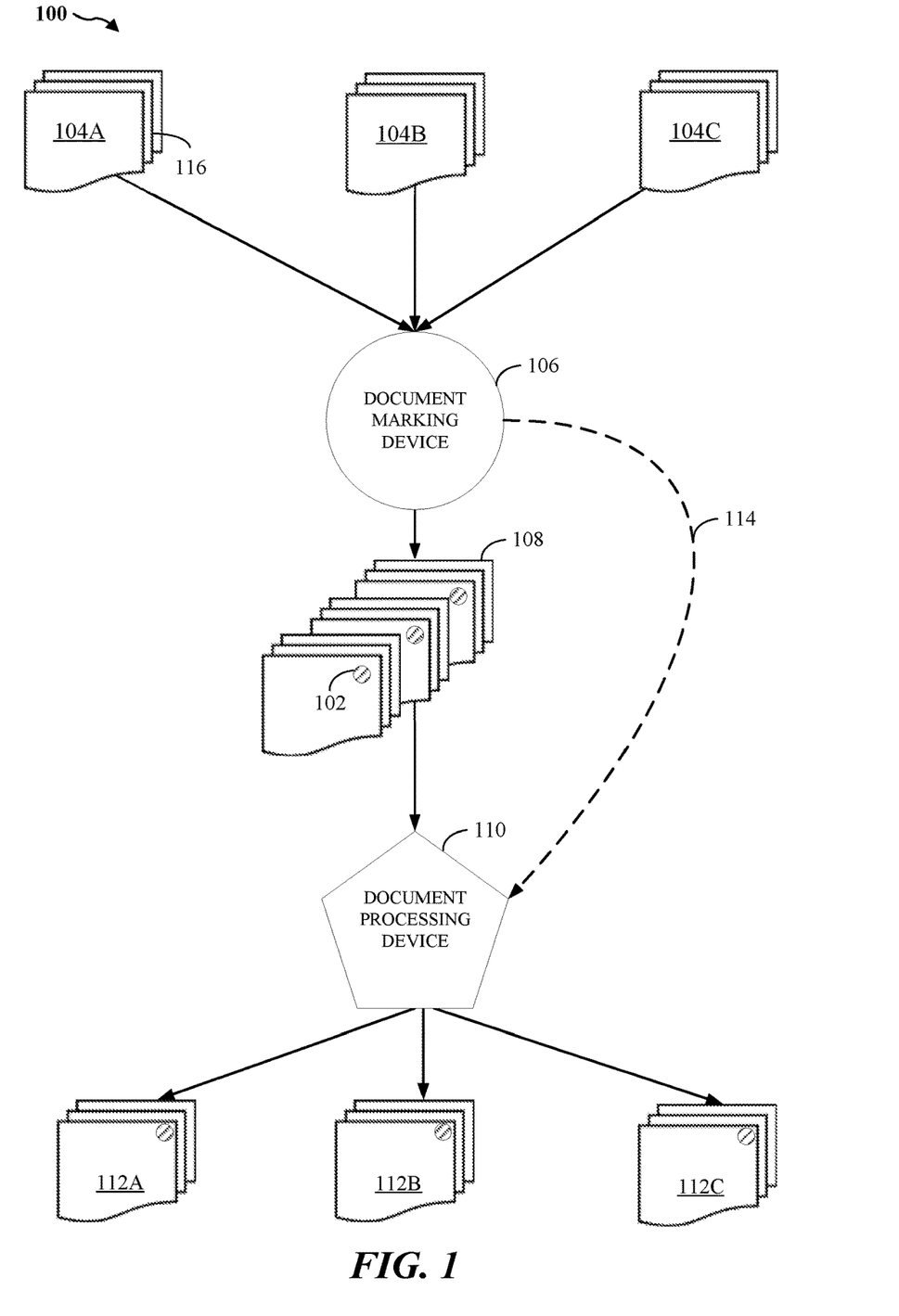
FIG. 1 illustrates a block diagram of a document processing system according to aspects of the present disclosure.

FIG. 1 illustrates a block diagram of a document processing system 100 according to aspects of the present disclosure. As shown in FIG. 1, the document processing system 100 receives different physical documents 104A, 104B, 104C. Physical document 104A, 104B, 104C includes one or more pages 116. For illustrative purposes, FIG. 1 illustrates each physical document 104A, 104B, 104C as having three pages 116. In one example, each physical document 104A, 104B, 104C is received at a document processing center in a storage unit, such as an envelope or box. For clarity, the physical documents 104A, 104B, 104C may be referred to as documents 104A, 104B, 104C.

The documents 104A, 104B, 104C may include, for example, negotiable instruments, such as checks, deposit slips, coupons, lottery tickets, or currency. Additionally, or alternatively, the documents 104A, 104B, 104C may include medical forms, credit applications, architectural drawings, mechanical drawings, envelopes, and other types of documents. The pages 116 of the documents 104A, 104B, 104C are not limited to paper pages. The pages may be printed on any material that is scannable, such as cardboard, plastic, metal, glass, and other media substrates or structures.

In one configuration, a first or last page 116 of each document 104A, 104B, 104C is input to a document marking device 106. The first or last page 116 may be input by a human operator. The document marking device 106 marks the page 116 to identify a start or end page of the document 104A, 104B, 104C. The document marking device 106 may be a device used by a human or an autonomous device.

For example, the document marking device 106 may be a pen, a stamp, or a printing apparatus (e.g., laser printer, ink jet printer, etc.). The mark 102 may be a machine-readable image, machine-readable text, a barcode, a quick response (QR) code, an invisible ink mark, or another type of mark identifiable by a mark validator and/or a mark detector. The type of mark 102 and/or location of the mark 102 may be preset by an operator or determined by the document marking device 106.

In the current example, the mark 102 is a circle in a corner of a first page 116 of each document 104A, 104B, 104C. Still, the mark 102 is not limited to a circle, other types of marks are contemplated. For example, the mark 102 may be two circles. Also, the mark 102 is not limited to a specific corner, or other areas, of a document. That is, the mark can be anywhere on the page. Additionally, the mark 102 is not limited to the first page 116 of each document 104A, 104B, 104C. As discussed, the mark 102 may also be defined on a last page 116 or the first and last page 116 of each document 104A, 104B, 104C.

After marking a page 116 from the documents 104A, 104B, 104C, the documents 104A, 104B, 104C are combined (e.g., stacked) to form a batch 108. For example, the second document 104B may be placed on top of the second document 104A. The third document 104C may be placed on the second document 104B, and so on, such that a batch 108 is formed. The batch 108 may be formed by a human or a stacking device. As discussed, rather than separately processing each document 104A, 104B, 104C by a document processing device 110, to improve processing time, the batch 108 is processed.

That is, as shown in FIG. 1, the batch 108 is fed (e.g., input) to the document processing device 110 for processing. In one configuration, the document processing device 110 captures an image of each page 116 of a document 104A, 104B, 104C. Still, the document processing device 110 is not limited to capturing images and may perform other tasks. The document processing device 110 may be in communications with the document marking device 106 via a communications channel 114. The document marking device 106 may notify the document processing device 110 of the selected mark 102 (e.g., type of mark, shape of the mark, color of the mark, and/or location of the mark) via a communications channel 114. The document processing device 110 and the document marking device 106 may be separate devices or may be components of the same device. As such, the communications channel 114 may be an external communications channel (e.g., Internet connection) or an internal communications channel (e.g., computer bus).

In an optional configuration, after receiving the selected mark 102 from the document marking device 106, the document processing device 110 begins processing the batch 108. In another configuration, the selected mark 102 is pre-set in the document processing device 110 and the document processing device 110 does not receive the selected mark 102 from the marking device 106. When processing the batch 108, the document processing device 110 may capture an image of a front and/or back of each page 116. Additionally, the document processing device 110 may scan each page 116 to detect the mark 102. As discussed below, the document processing device 110 may initiate a process for separating adjacent documents 104A, 104B, 104C after detecting the mark 102. For example, based on whether the mark 102 was placed on the first or last page 116 of a document 104A, 104B, 104C, a virtual separator sheet may be placed in front of or behind the marked page 116.

After processing the batch 108, the document processing device 110 outputs separated documents 112A, 112B, 112C that are separated based on the marked pages 116 of the physical documents 104A, 104B, 104C. That is, each separated document 112A, 112B, 112C corresponds to one of the physical documents 104A, 104B, 104C. The separated documents 112A, 112B, 112C may be scanned documents (e.g., electronic documents).

In one configuration, the batch 108 is a batch of electronic documents. That is, a document processing center may receive a scanned batch 108. For example, one document processing center may scan documents 104A, 104B, 104C without separating the documents 104A, 104B, 104C. The scanned documents 104A, 104B, 104C form a batch 108. Another document processing center may receive the scanned batch 108 and may electronically mark the first or last page 116 of each document 104A, 104B, 104C in the scanned batch 108. The document processing device 110 may then proceed to separate the documents 104A, 104B, 104C as previously discussed.

Figure 2:
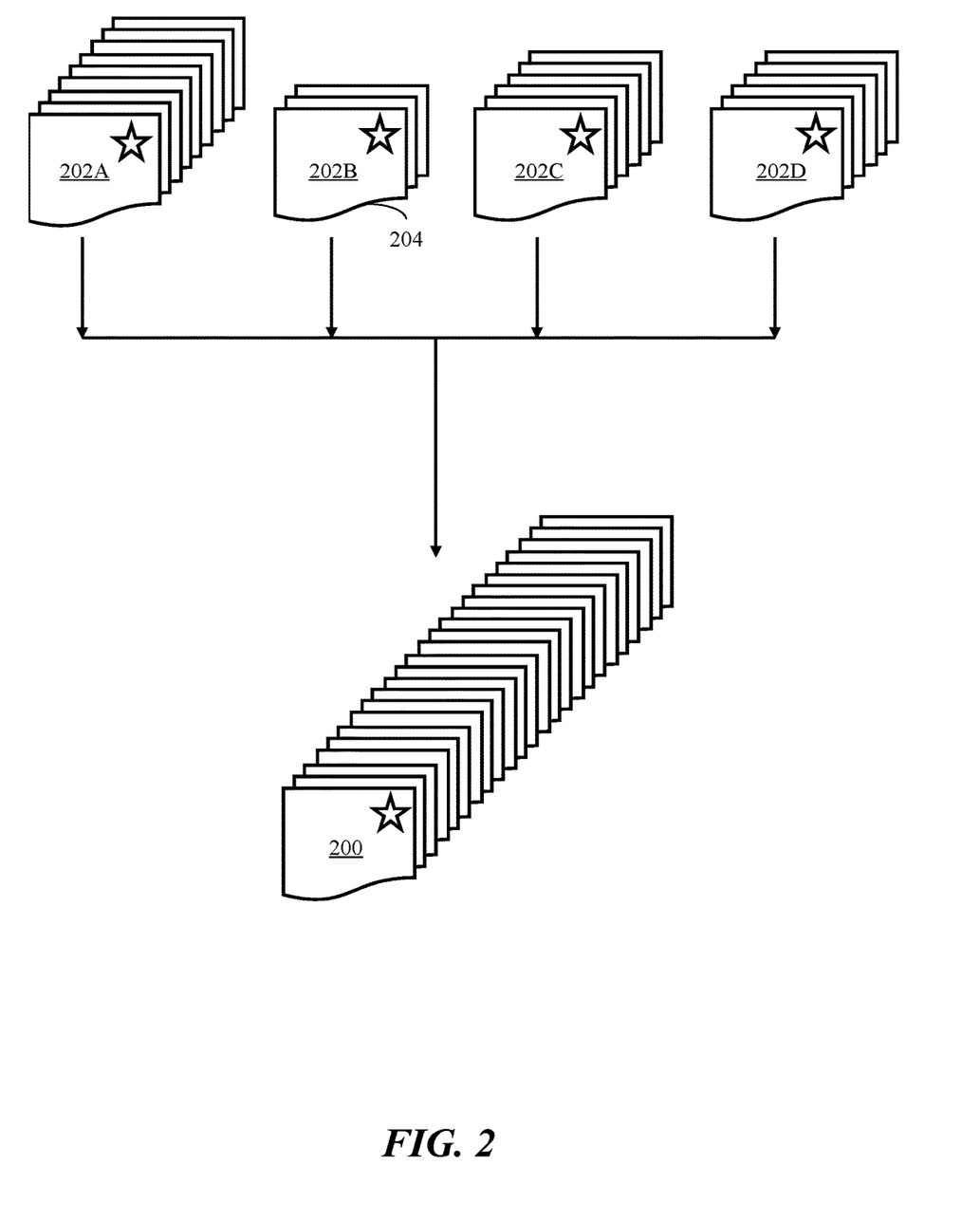
FIG. 2 illustrates an example of a batch of documents according to aspects of the present disclosure.

FIG. 2 illustrates an example of a batch 200 according to aspects of the present disclosure. As shown in FIG. 2, different documents 202A, 202B, 202C, 202D may be merged to form the batch 200. Each document 202A, 202B, 202C, 202D may be composed of different types of pages 204 or a same type of page 204, such as bills or medical records. Additionally, the pages 204 in each document 202A, 202B, 202C, 202D may have different shapes and/or thicknesses. The pages 204 in each document 202A, 202B, 202C, 202D may be unrelated to one another and/or may be in any order. The documents 202A, 202B, 202C, 202D are merged and processed together as a batch 200.

When merging the documents 202A, 202B, 202C, 202D, the individual pages 204 from each document 202A, 202B, 202C, 202D are not merged together. Rather, the documents 202A, 202B, 202C, 202D may be sequentially grouped to form a batch 200. For example, second documents 202B may be placed on top first documents 202A. Subsequently, third documents 202C may be placed on top of the second documents 202B, and so on.

Figure 3A:
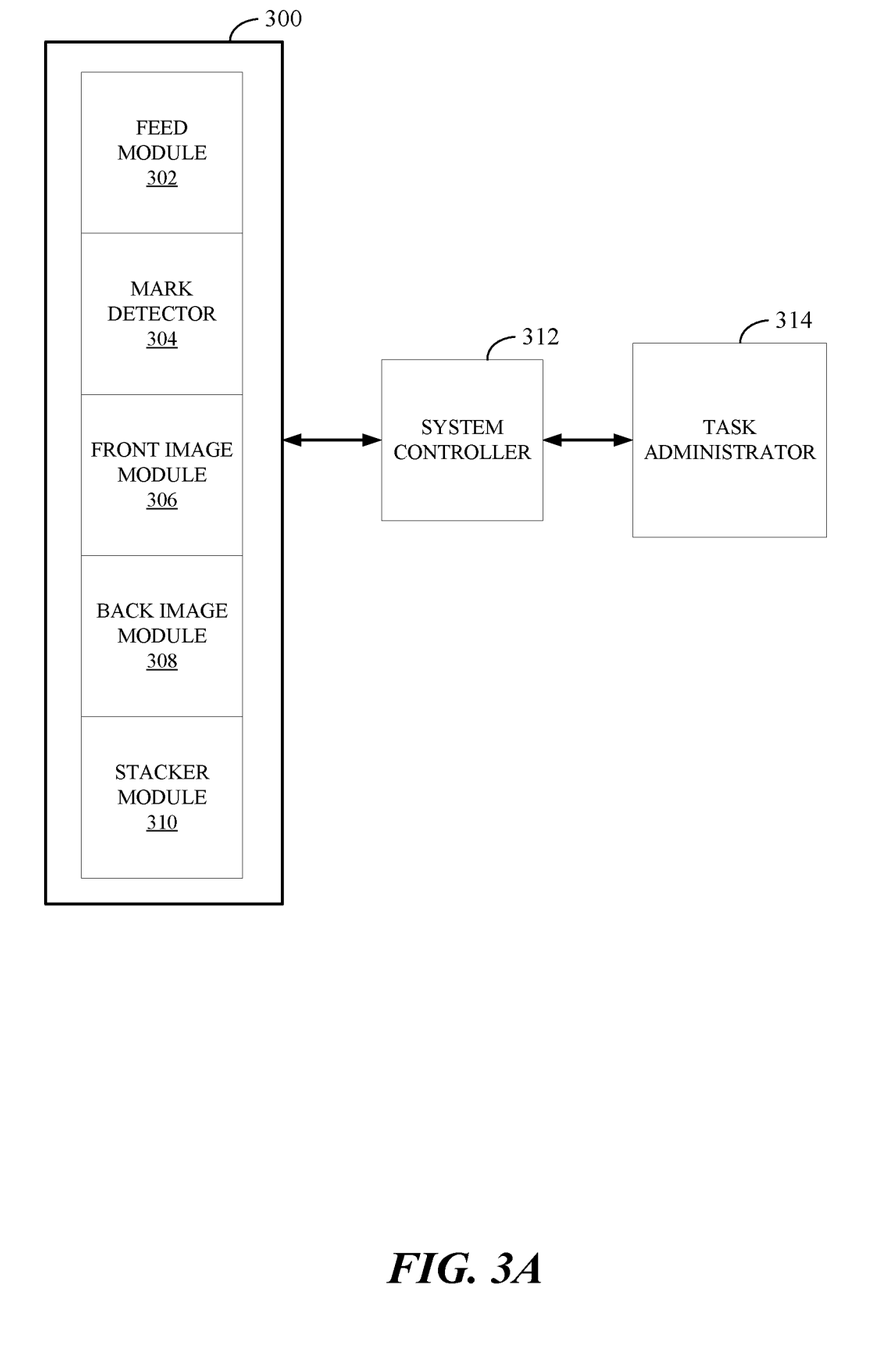
FIG. 3A illustrates a block diagram of a transport system of a document processing device according to aspects of the present disclosure.

FIG. 3A illustrates a block diagram of a transport system 300 of a document processing device according to aspects of the present disclosure. The transport system 300 transports pages along a transport path (not shown in FIG. 3). As shown in FIG. 3A, the transport system 300 includes a feed module 302 for feeding documents on the transport path. That is, the feed module 302 moves each page through the transport path of the document processing device, such that each page is processed by a different module.

Additionally, as shown in FIG. 3A, the transport system 300 includes a mark detector 304, a front image module 306, a back image module 308, and a stacker module 310. The transport system 300 may be controlled by a system controller 312. In one configuration, a task administrator 314 may control functions of the transport system 300 via the system controller 312. For example, the task administrator 314 may be a remote device that is used to initiate a document processing task, such as capturing electronic images of pages (e.g., scanning pages). As another example, the task administrator 314 may be a module of the document processing device. In this example, a user may initiate document processing by commands that are input via a user interface associated with the task administrator 314.

In one configuration, the mark detector 304 scans each page to detect a mark. The mark detector 304 may be a hardware device or software. Additionally, the mark detector 304 may be before or after the front image module 306 and back image module 308. That is, in one configuration, the mark detector 304 scans the electronic image(s) captured by the front image module 306 and/or the back image module 308.

The front image module 306 captures an electronic image of the front side of a page, and the back image module 308 captures an electronic image of the back side of the same page processed by the front image module 306. The back image module 308 may be omitted from the process if only one side of a page is to be scanned. The transport system 300 may also include sensors, such as light sensors, to track each page that is fed along the transport path. The tracking may be used by the system controller 312 to determine a location of a page on the transport path. Finally, the stacker module 310 may stack pages at the end of the path. For example, once a page is processed by the different modules 302, 304, 306, 308, the stacker module 310 stacks the page on top of previously processed pages.

Figure 3B:
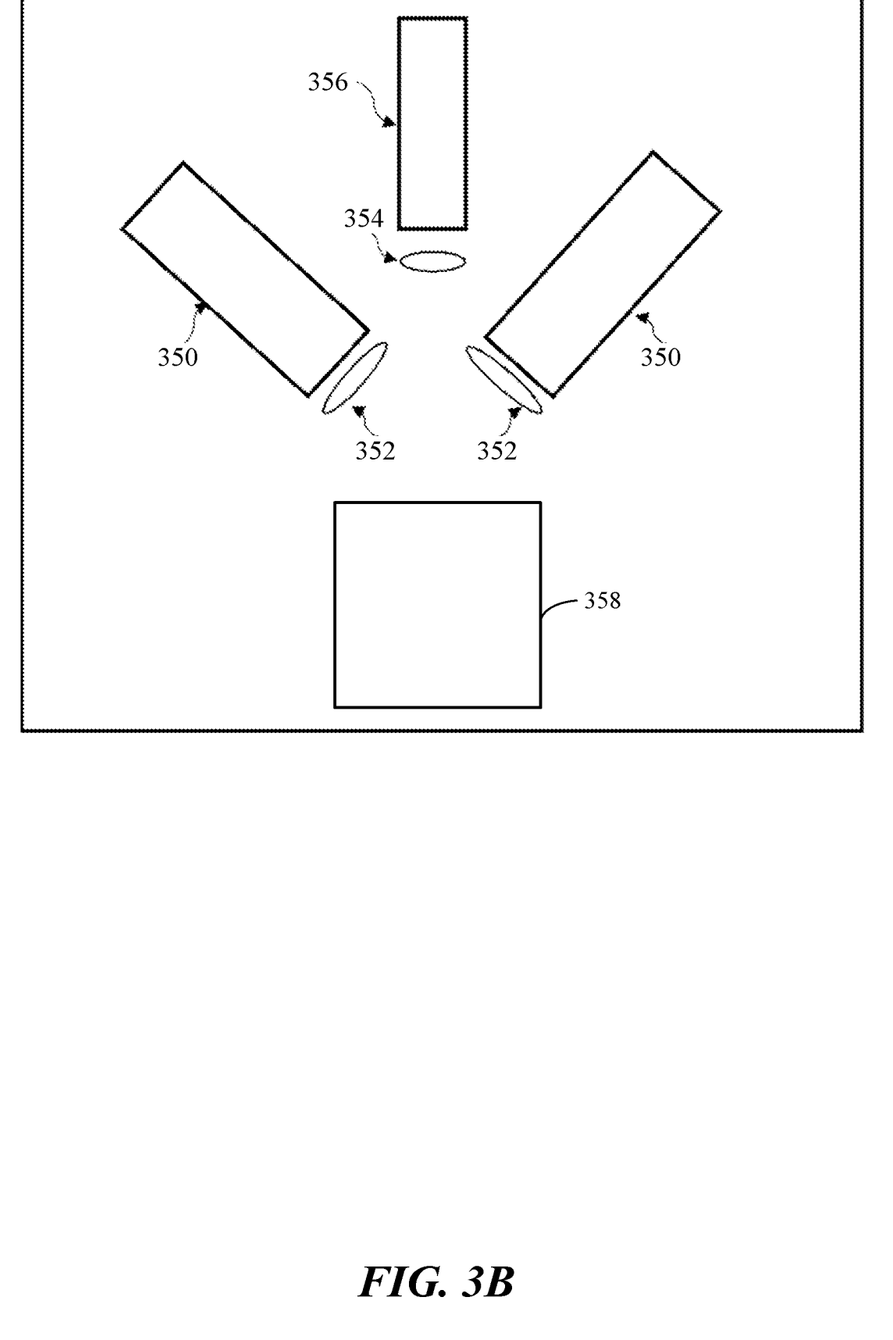
FIG. 3B illustrates an example of a light source and an optical collector of a document processing device according to aspects of the present disclosure.

In one configuration, the mark detector 304 includes a light source 350 to illuminate a document 358 and an optical collector 356 to receive light reflected by the document 358 (see FIG. 3B). The light source 350 and the optical collector 356 may be adjustable to improve detection of the color changed identifier. That is, a controller (not shown) may control the light source 350 and/or the optical collector 356 to adjust an angle (e.g., position) for omitting or receiving light.

Specifically, the light source 350 may be controlled in both a frequency range of the light illuminated onto the document 358 and an angle of which the light is transmitted onto the document 358. A light source filter 352 may filter a frequency of the light source 350. An optical collector filter 354 may control a frequency range of the light received at the optical collector 356.

The mark detector 304 may customize both the light source 350 and the optical collector 356 for specific business processes, such as a detection of a color change in either a visible range or an infrared range. The light source 350, light source filter 352, optical collector 356, and optical collector filter 354 may be a component of the mark detector 304 or a separate component. The light source 350, light source filter 352, optical collector 356, and optical collector filter 354 may be collectively referred to as an information detector.

Figure 4:
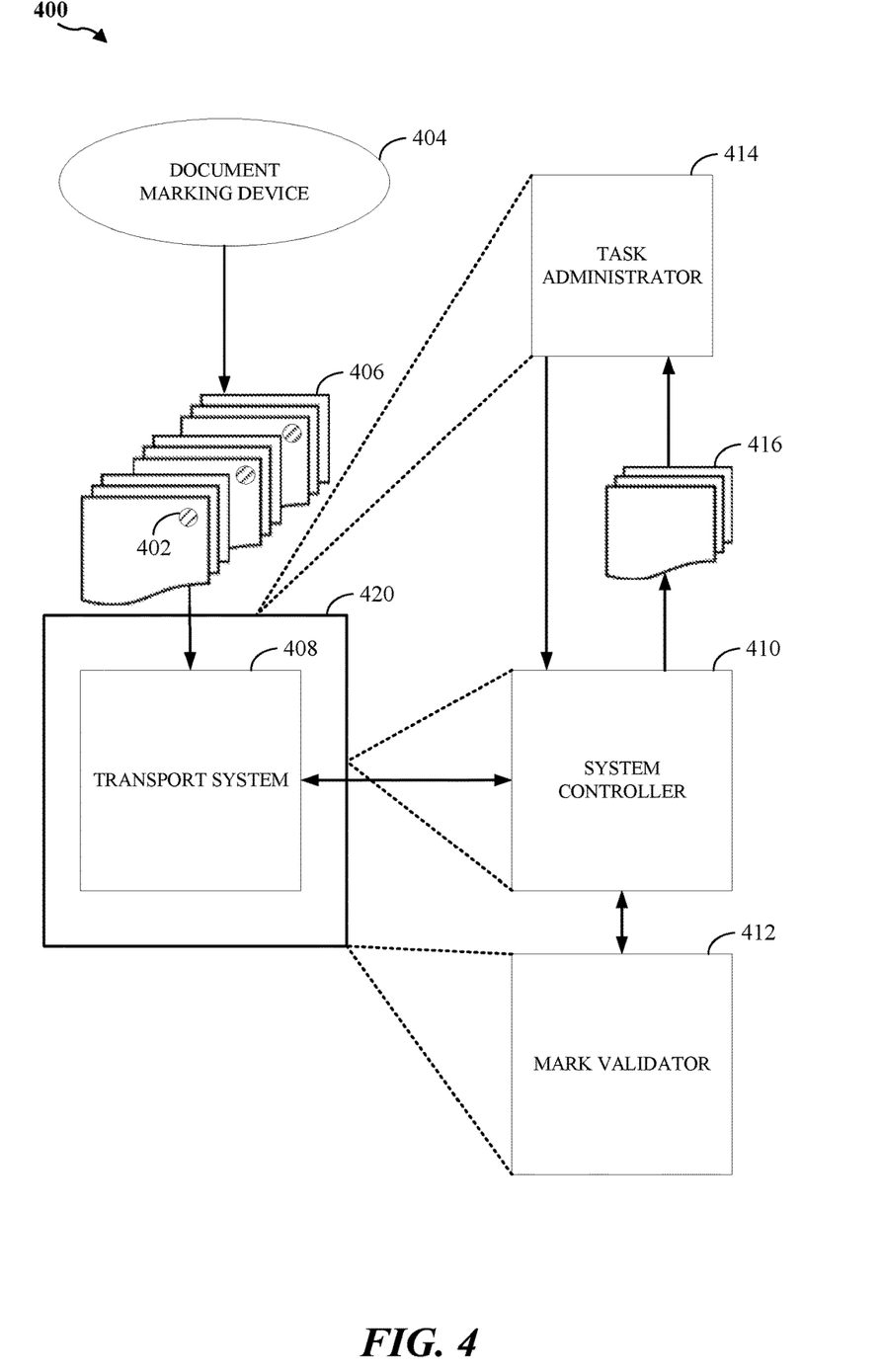
FIG. 4 illustrates a block diagram for processing documents according to aspects of the present disclosure.

FIG. 4 illustrates a block diagram 400 for processing documents according to aspects of the present disclosure. As shown in FIG. 4, a batch 406 of marked documents is generated by a document marking device 404. As discussed, the document marking device 404 marks a first or last page of each document with a mark 402. In this example, the first page of each document includes the mark 402.

A feed module of a transport system 408 feeds each physical page of the batch 406 along a transport system path. The transport system 408 is integrated with a document processing device 420. In one configuration, a mark detector scans each physical page to determine whether the page includes the mark 402. Additionally, a front image module captures an electronic image of the front side of a physical page, and a back image module captures an electronic image of the back side of the same physical page.

In one configuration, a system controller 410 receives data from the mark detector. In this configuration, the system controller 410 receives data corresponding to each page scanned by the mark detector. The data may be an indication that a page includes a marking. For example, the data may be a flag, where a positive flag identifies a marked page.

The system controller 410 may be hardware or software. The system controller 410 may be integrated with the document processing device 420 or may be integrated with a remote computing device. When the system controller 410 is integrated in a remote device, the remote computing device may communicate with the document processing device 420 via a wired or wireless communications channel.

When the mark detector identifies a marked page, a mark validator 412 determines a validity of the detected mark 402. If the page includes a valid mark 402, the document corresponding to the marked page may be separated from an adjacent document. The mark validator 412 may be a module of the document processing device 420 or a separate module (e.g., computing device) that is remote from the document processing device 420. In one configuration, the mark validator 412 is a component of the mark detector.

In another configuration, the mark validator 412 is a separate hardware or software component of the transport system 408 or system controller 410. In yet another configuration, the mark validator 412 is implemented on a device that is remote from the document processing device 420. For example, the mark validator 412 may be a software component of a remote computing device. The remote computing device may communicate with the document processing device 420 via a wired or wireless communications channel.

As previously discussed, in a conventional calibration page system, the conventional document processing devices, or associated devices, determine a type of mark to identify based on a calibration page. The calibration page system does not handle false positives, such as marks in incorrect locations. Additionally, the calibration page system does not compensate for background color.

In some cases, a mark may be placed in a location that does not correspond to the mark location selected by the document marking device 404. For example, the document marking device 404 may be set to mark the top right corner of a page. An error may occur if the mark is located at an incorrect location, such as a bottom left corner. A mark in the incorrect location may be referred to as an incorrect mark, and a mark in the correct location may be referred to as a correct mark. An incorrect mark may be caused by human error and/or machine error. For example, a human operator may stamp a wrong spatial area of a page with the document marking device 404. In this example, the incorrect insertion may place the mark in an incorrect location. A mark in an incorrect location may be referred to as a false positive mark.

As another example of a false positive mark, a page may already include a mark that is similar to the selected mark. For example, a page may include colored markings, such as highlighting or redaction marks, in one or more spatial locations. In this example, if the mark is the same color as the colored markings, a conventional mark validator may incorrectly identify one of the colored markings as the mark. An original mark of a page that is in a same location as a selected mark may be referred to as a false positive mark. An original mark refers to a mark that is present on the page prior to processing by a document processing device. The selected mark refers to a mark provided on the page by a marking device.

In yet another example of a false positive mark, a page may already include one or more marks that are similar to the selected mark. For example, the selected mark may be a triangle. In this example, if the mark includes two or more triangles in different locations, a conventional mark validator may fail to correctly separate the documents corresponding to the marked page. The selected mark refers to a mark provided on the page by a marking device.

In still yet another example of a false positive mark, when a page includes original colored markings, the selected mark may blend into the colored marking if the selected mark is the same color as the original colored marking and overlaps with one of the original colored markings. For example, a page may be redacted with black redaction marks. In this example, the selected mark is a black circle. As such, if the selected mark is placed over an area with a black redaction mark, the selected mark will not be visible to a conventional mark validator.

According to aspects of the present disclosure, the mark validator 412 may identify a marking in a location corresponding to the selected mark location. In the example above, the mark validator 412 may identify a black marking in a location corresponding to the selected mark location. Therefore, the mark validator may flag the page as having a false positive mark. As such, the false positive mark also refers to a situation where one or more original marks of a page correspond to a location of the selected mark and match a shape and/or color of the selected mark. A page with a false positive mark may be flagged for further review.

A page may include one or more of the selected mark and/or the false positive mark. In one configuration, the mark validator 412 determines if the page includes a false positive mark. If the page includes the false positive mark, the document and/or page may be flagged as an error. In one configuration, when a document and/or page is flagged for an error, a quality control function is initiated. The quality control may include further analysis by a human operator, generating a notification, stopping the document processing system, and/or other types of quality control analysis.

In another configuration, the mark validator compensates for background color. According to aspects of the present disclosure, the mark may be any color that is identifiable by a hardware component or a software component, such as the mark validator 412 or the document processing device 420. In some cases, the color of the mark may change due to the color of the document. Conventional systems may not detect the mark due to the change of color. For example, if a red colored mark is placed on white paper, the mark will show the true red color. As another example, if the red mark is placed on blue paper, the mark may change to a violet fuchsia color. In this example, a conventional system would not detect the violet fuchsia mark.

In one configuration, when determining if a page includes the mark 402, the mark validator 412 considers the change in color. That is, the mark validator 412 has prior information, from the document marking device 404, regarding the color and type of mark. In this configuration, the mark validator 412 and/or the mark detector may determine the color of the current page. The mark validator 412 and/or the mark detector may also identify the colors of one or more markings on the page. Accordingly, the mark validator 412 may determine the resulting color from the combination of the color of the current page and the color of the mark.

The resulting color may be determined by a color combination function that combines the two colors to determine the combined color. Additionally, or alternatively, the resulting color may be pre-set and identified by looking up the mark color and the page color. After determining the resulting color, the mark validator 412 may then identify a mark corresponding to the resulting color of the mark instead of the original color of the mark.

Additionally, as shown in FIG. 4, a task administrator 414 may control functions of the transport system 408 and the mark validator 412 via the system controller 410. As discussed, the task administrator 414 may initiate a document scan. As shown in FIG. 4, in one configuration, the system controller 410 transmits an electronic file 416 of the separated documents to the task administrator 414. For example, the system controller 410 may transmit the electronic file 416 to an email address or remote storage device corresponding to the task administrator 414.

The electronic file 416 may include all documents in the batch 406, where the documents are separated. Alternatively, the system controller 410 transmits multiple electronic files 416 to the task administrator 414. In this configuration, each electronic file corresponds to one document that has been separated from the batch 406.

The content of the electronic file 416 may be set by a user via the task administrator 414. That is, the task administrator 414 may communicate with one or more of the transport system 408, system controller 410, and mark validator 412 to perform user-specific tasks. The task administrator 414 may be a device and/or software component that is integrated with a remote computing device or the document processing device 420. The remote computing device may communicate with the document processing device 420 via a wired or wireless communications channel.

The electronic file 416 received by the task administrator 414 may not be distinguishable from another electronic file generated by a conventional document processing device. As such, any downstream components integrated with the task administrator 414 or configured for receiving the electronic file 416 may not determine a difference between an electronic file generated via a conventional document processing device and the electronic file 416 generated according to aspects of the present disclosure.

Figure 5:
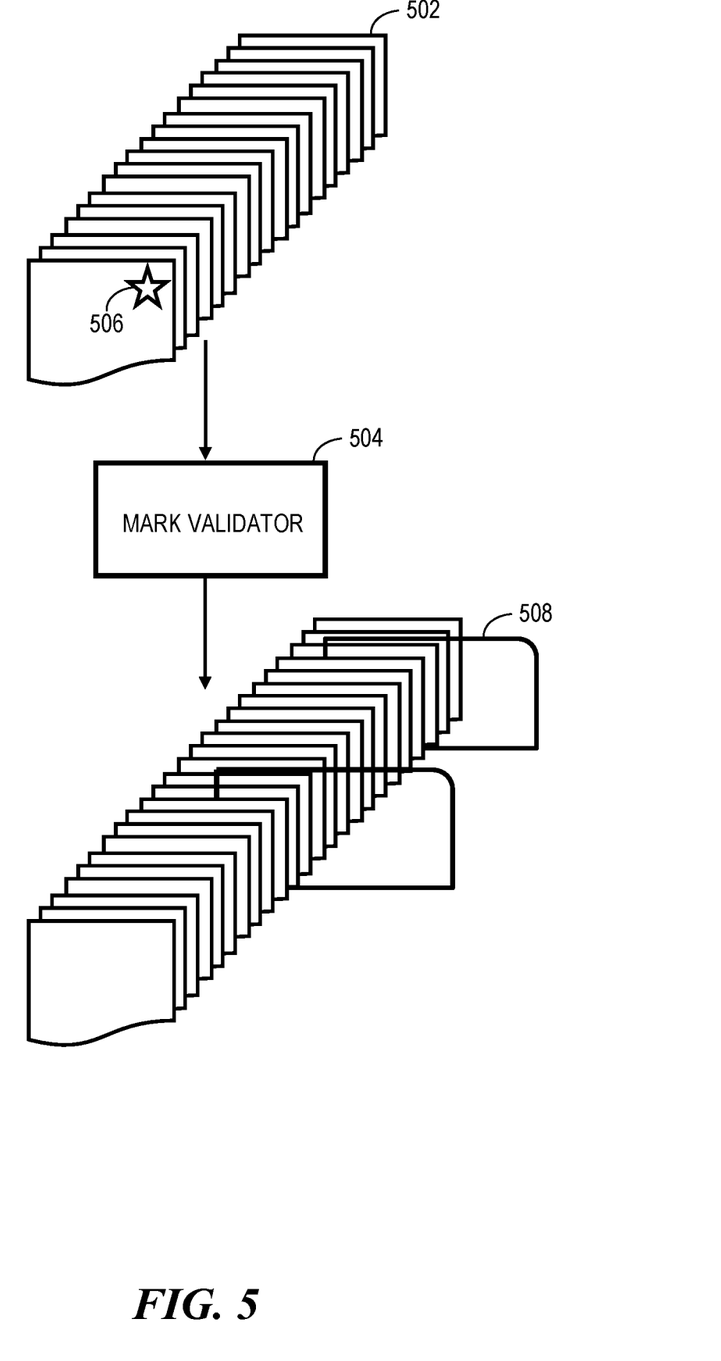
FIG. 5 illustrates an example of inserting a virtual separator page according to aspects of the present disclosure.

FIG. 5 illustrates an example of inserting a virtual separator sheet according to aspects of the present disclosure. As shown in FIG. 5, a batch of marked documents 502 may be processed by document processing device. The content of each page in the batch of marked documents 502 may be analyzed by a mark validator 504. Upon detecting a mark 506 on a page, the mark validator 504 may flag the page. Based on the flag, the document may be separated from an adjacent document. In one configuration, a virtual separator sheet 508 is used to separate documents.

In one example, the mark 506 is placed on the first page of each document. In this example, the mark validator detects the mark 506 on the first page of an initial document. Additionally, upon detecting a subsequent mark 506, the mark validator 504 determines that a previous page was the last page of the initial document. As such, the mark validator 504 inserts a virtual separator sheet 508 between the last page of the initial document and a first page of the current document. That is, the mark validator 504 inserts a virtual separator sheet 508 before the first page of the current document. The virtual sheet separates the current documents from the initial document. The process continues until all documents are separated. The virtual sheet may be an image of a separator sheet.

In another example, the mark 506 is placed on the last page of each document. In this example, upon detecting the mark 506 on a page of a document, the mark validator 504 determines that the current page is the last page of the document. As such, the mark validator 504 inserts a virtual sheet after the current page with the mark 506. The process continues until all groups of documents are separated via a virtual sheet.

The output file may be one file including the batch of marked documents 502 separated with virtual separator sheets 508. That is, the one file may include all of the pages in the batch of marked documents 502. In another example, different output files may be generated based on the virtual separator sheets 508. That is, after inserting the virtual separator sheet 508, an output file may be generated for the documents. The pages in the output file may be determined based on the virtual separator sheets 508. In this example, multiple output files are generated from the batch of marked documents 502.

As discussed, aspects of the present disclosure are not limited to using virtual separator sheets. The documents may be separated via other separation systems. For example, each document may be flagged and scanned from the determined first and last page. The scanned document may be stored in a separate portion of memory. The process may continue until all documents are separated and scanned.

Figure 6:
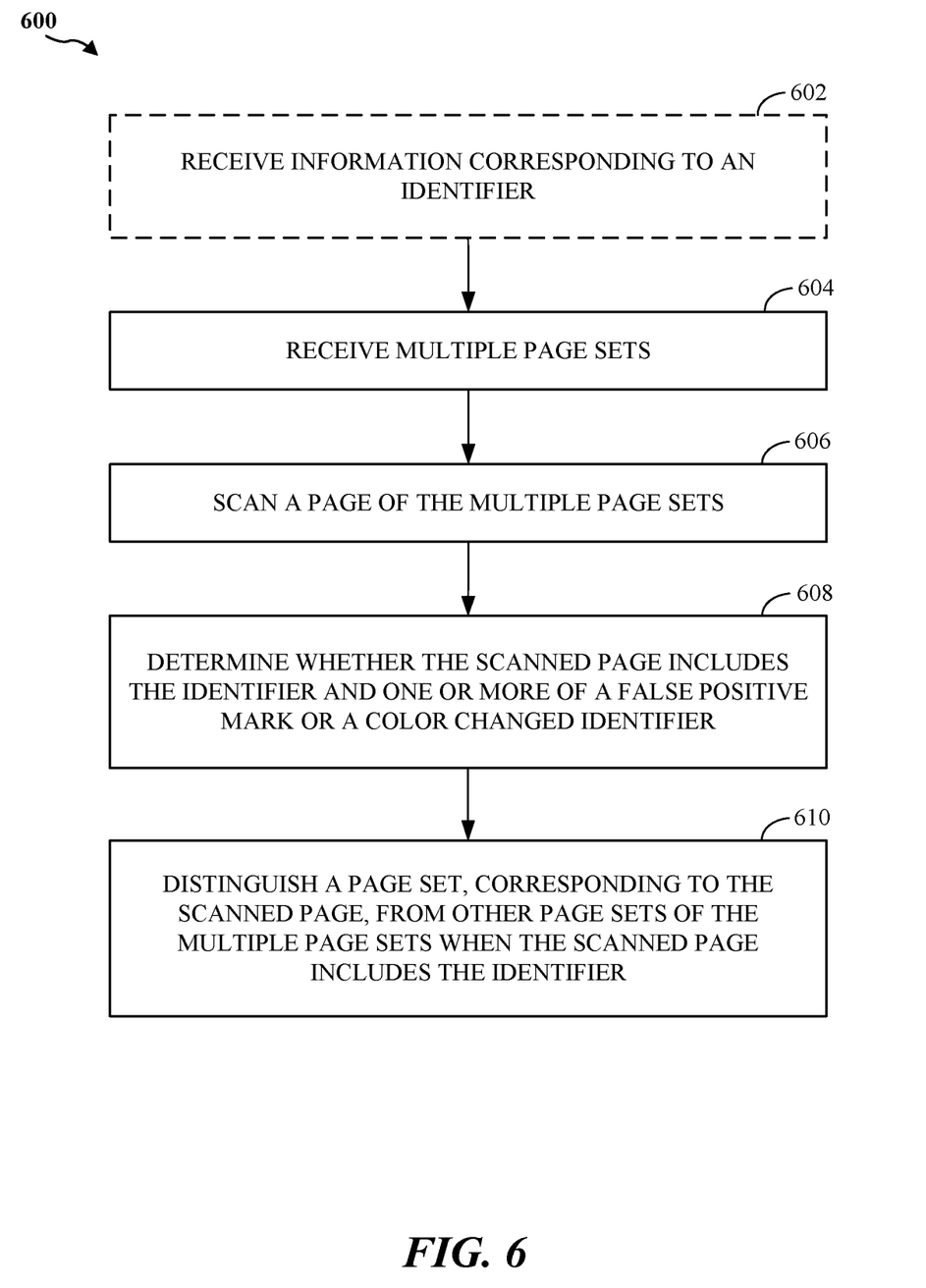
FIG. 6 illustrates a flow diagram for separating a page set from multiple page sets according to aspects of the present disclosure.

FIG. 6 illustrates a method 600 for distinguishing a page set from other page sets according to an aspect of the present disclosure. As shown in FIG. 6, at block 602, in an optional configuration, a document processing device receives information corresponding to an identifier. The identifier is used for distinguishing one page set from an adjacent page set of the multiple page sets.

The information includes a color of the identifier, a shape of the identifier, and/or a spatial location of the identifier. The identifier includes a shape, text, and/or a barcode. The page set may be referred to as a document, where each document includes multiple pages. The multiple page sets may be referred to as a batch of documents.

The information may be received from an information detector. The information detector may include a light source for projecting spectrum of light on the page. The light may be projected at an angle that is acute in relation to the page. The mark detector may also include a light source filter for filtering the spectrum of light projected onto the page. The information detector may further include an optical collector for receiving light reflected from the page. An optical collector filter may be used to filter the spectrum of reflected light received at the optical collector.

At block 604, the document processing device receives the multiple page sets. A first page or a last page of each page set is marked with the identifier. At block 606, the document processing device scans a page of the multiple page sets. That is, the document processing device page obtains a digital image of the page. The page may be a medical insurance claim form, a medical insurance explanation of benefits statement, an x-ray, a credit application, a check, a deposit slip, a remittance statement, a coupon, a lottery ticket, an architectural drawing, a mechanical drawing, an envelope, or any other type of document.

At block 608, the document processing device determines whether the scanned page includes the identifier and one or more of a false positive mark or a color changed identifier. The document processing device may initiate a quality control function in response to determining the page includes the false positive mark.

To determine whether the page includes the false positive, the document processing device determines whether the page includes the identifier in a spatial location that is different from an intended spatial location of the identifier. Additionally, the document processing device determines whether the page includes a marking matching a color of the identifier or a shape of the identifier in the intended spatial location of the identifier.

To determine whether the page includes the color changed identifier, the document processing device determines a color of the page. The document processing device also determines a resulting color from a combination of the color of the page and a color of the identifier. Additionally, the document processing device determines whether the page includes the identifier having a same color as the resulting color in a spatial location of the identifier.

At block 610, the document processing device distinguishes a page set, corresponding to the scanned page, from other page sets of the multiple page sets when the scanned page includes the identifier. The page set may be distinguished by flagging the page set, inserting a separation image before the page, or inserting the separation image after the page. The separation image may be a virtual image or an image on a physical page. The document processing device may output an electronic file including the multiple page sets, where each page set is distinguished from the other page sets. Alternatively, the document processing device may output one electronic file for each distinguished page set.

The document processing device may include a document marking device, an automated document feeder, a mark detector, a mark validator, an image camera, a stacker, a pocket, and a system controller. The document processing device may be a non-impact or impact printing device. Additionally, the document processing device may be controlled manually or controlled by the transport system.

In one configuration, the feeder controls the speed and feed rate of pages. Additionally, the detector scans the pages for a color changed identifier. As discussed, the identifier's color may change based on a color of a page. Finally, the validator may be used to increase the accuracy of detecting the color changed identifier.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine-readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communications media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for distinguishing a page set, comprising:
receiving a plurality of page sets, at least one of a first page or a last page of each page set marked with an identifier;
scanning a page of the plurality page sets;
determining whether the scanned page comprises the identifier and at least one of a false positive identifier or a color changed identifier; and
distinguishing the page set, corresponding to the scanned page, from other page sets of the plurality of page sets when the scanned page includes the identifier.

2. The method of claim 1, in which determining whether the scanned page comprises the false positive identifier comprises identifying at least one of:
the identifier in a spatial location that is different from an intended spatial location of the identifier;
a marking matching at least one of a color of the identifier or a shape of the identifier in the intended spatial location of the identifier; or
a plurality of identifiers in different spatial locations.

3. The method of claim 1, in which determining whether the scanned page comprises the color changed identifier comprises:
determining a color of the scanned page;
determining a resulting color from a combination of the color of the scanned page and a color of the identifier; and
determining whether the scanned page comprises the identifier having a same color as the resulting color in a spatial location of the identifier.

4. The method of claim 1, further comprising initiating a quality control function in response to determining the scanned page comprises the false positive identifier.

5. The method of claim 1, in which distinguishing the page set comprises flagging the page set, inserting a separation image before the page, or inserting the separation image after the page.

6. The method of claim 1, in which the identifier comprises at least one of a shape, text, or a barcode.

7. The method of claim 1, in which scanning the page comprises obtaining a digital image of the page.

8. The method of claim 1, further comprising receiving information corresponding to the identifier, the identifier used for distinguishing one page set from an adjacent page set of the plurality of page sets.

9. The method of claim 8, in which the information comprises at least one of color of the identifier, a shape of the identifier, or a spatial location of the identifier.

10. The method of claim 8, further comprising obtaining, via an information detector, the information.

11. The method of claim 10, further comprising:
projecting, from a light source of the identifier information detector, a spectrum of light on the page; and
receiving, at an optical collector of the identifier information detector, reflected light from the page.

12. An apparatus for distinguishing a page set, the apparatus comprising:
a memory;
a page receiver for receiving a plurality of page sets, at least one of a first page or a last page of each page set marked with an identifier;
a scanner for scanning a page of the plurality page sets; and
at least one processor coupled to the memory, the at least one processor configured:
to determine whether the scanned page comprises the identifier and at least one of a false positive identifier or a color changed identifier; and
to distinguish the page set, corresponding to the scanned page, from other page sets of the plurality of page sets when the scanned page includes the identifier.

13. The apparatus of claim 12, in which the at least one processor is further configured to determine whether the scanned page comprises the false positive identifier by identifying at least one of:
the identifier in a spatial location that is different from an intended spatial location of the identifier;
a marking matching at least one of a color of the identifier or a shape of the identifier in the intended spatial location of the identifier; or
a plurality of identifiers in different spatial locations.

14. The apparatus of claim 12, in which the at least one processor is further configured to determine whether the scanned page comprises the color changed identifier by:
determining a color of the scanned page;

determining a resulting color from a combination of the color of the scanned page and a color of the identifier; and determining whether the page comprises the identifier having a same color as the resulting color in a spatial location of the identifier.

15. The apparatus of claim 12, in which the at least one processor is further configured to initiate a quality control function in response to determining the scanned page comprises the false positive identifier.

16. The apparatus of claim 12, in which the at least one processor is further configured to distinguish the page set by flagging the page set, inserting a separation image before the page, or inserting the separation image after the page.

17. The apparatus of claim 12, in which the identifier comprises at least one of a shape, text, or a barcode.

18. The apparatus of claim 12, in which scanning the page comprises obtaining a digital image of the page.

19. The apparatus of claim 12, in which the at least one processor is further configured to receive information corresponding to the identifier, the identifier used for distinguishing one page set from an adjacent page set of the plurality of page sets.

20. The apparatus of claim 19, in which the information comprises at least one of color of the identifier, a shape of the identifier, or a spatial location of the identifier.

21. The apparatus of claim 19, in which the apparatus further comprises an information detector for obtaining the information.

22. The apparatus of claim 21, in which the information detector comprises:

a controllable light source for projecting a spectrum of light on the page; and an optical collector for receiving reflected light from the page.

23. A non-transitory computer-readable medium having program code recorded thereon for distinguishing a page set, the program code executed by a processor and comprising:

program code to receive a plurality of page sets, at least one of a first page or a last page of each page set marked with an identifier;

program code to scan a page of the plurality page sets;

program code to determine whether the scanned page comprises the identifier and at least one of a false positive identifier or a color changed identifier; and program code to distinguish the page set, corresponding to the scanned page, from other page sets of the plurality of page sets when the scanned page includes the identifier.

24. The non-transitory computer-readable medium of claim 23, in which the program code for determining whether the scanned page comprises the false positive identifier comprises:

program code to determine whether the scanned page includes the false positive identifying by identifying at least one of:

the identifier in a spatial location that is different from an intended spatial location of the identifier;

a marking matching at least one of a color of the identifier or a shape of the identifier in the intended spatial location of the identifier; or a plurality of identifiers in different spatial locations.

25. The non-transitory computer-readable medium of claim 23, in which the program code for determining whether the page comprises the color changed identifier comprises:

program code to determine a color of the scanned page;

program code to determine a resulting color from a combination of the color of the scanned page and a color of the identifier; and program code to determine whether the page comprises the identifier having a same color as the resulting color in a spatial location of the identifier.

\* \* \* \* \*